April 9, 1940.    P. H. WOLF    2,196,689
CONTAINER FOR INDIVIDUALIZED PACKAGING
Filed June 9, 1938
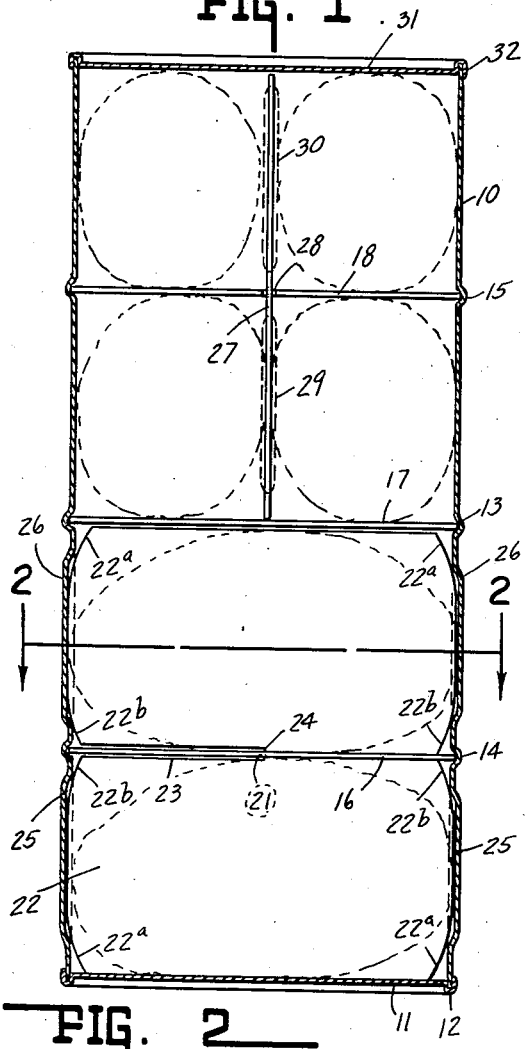
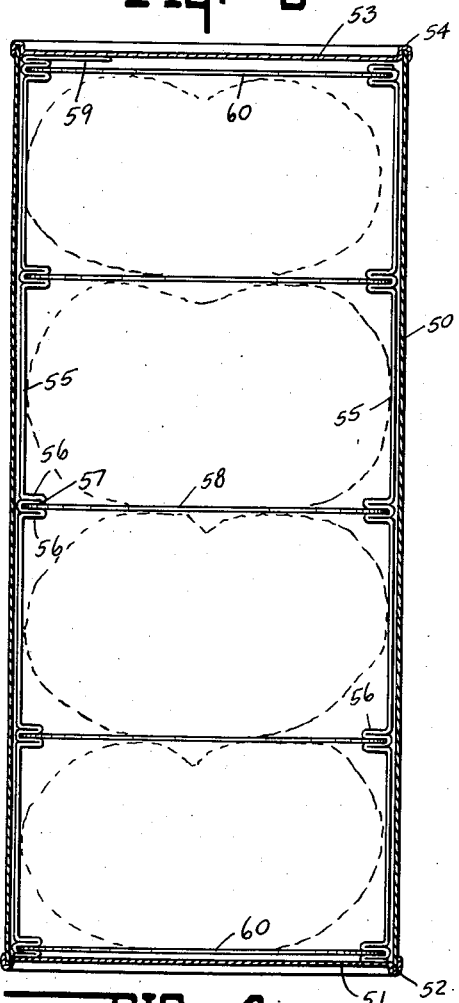
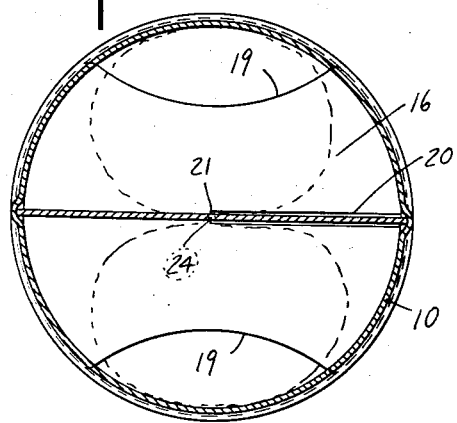
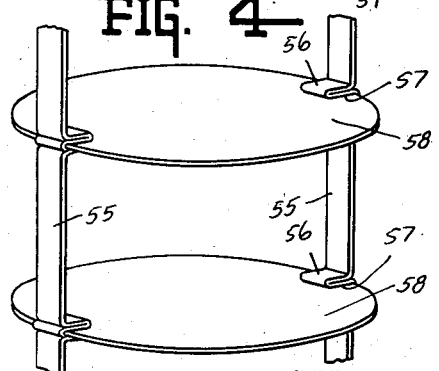
INVENTOR.
PAUL H. WOLF.
BY Lockwood, Goldsmith & Galt.
ATTORNEYS.

Patented Apr. 9, 1940

2,196,689

UNITED STATES PATENT OFFICE 2,196,689

CONTAINER FOR INDIVIDUALIZED PACKAGING

Paul H. Wolf, Morristown, Ind.

Application June 9, 1938, Serial No. 212,664

1 Claim. (Cl. 220—22)

This invention relates to the method of, and a container arrangement for the packaging of whole fruit and the like.

The chief object of the invention is to provide a container arrangement which may be filled with whole fruit and the like which, by means of container sustained partition means, is adapted to maintain the several fruits in segregated relation.

The chief feature of the invention consists in providing a container with partition means maintained in predetermined relation through container support whereby whole fruits and the like may be maintained in separated relation so that in the subsequent transportation, storage and the like the whole fruit will not be deformed, crushed, broken down or otherwise damaged as to form incident to such handling or storage, so that when the whole fruit and the like is removed from the container the whole fruit is in substantially the same physical form in which it was originally packaged.

Other objects and features of the invention will be set forth hereinafter.

The full nature of the invention will be understood from the accompanying drawing and the following description and claim:

In the drawing

Fig. 1 is a central sectional view through a container provided with partitions and illustrating a complicated form of the invention which embodies simpler forms of the invention.

Fig. 2 is a transverse sectional view taken on line 2—2 of Fig. 1 and in the direction of the arrows.

Fig. 3 is a central sectional view through a modified form of package embodying the invention.

Fig. 4 is a perspective view of a portion of the segregating or partition arrangement illustrated in Fig. 3.

The present invention contemplates the utilization of a container and certain partition means, which partition means are sustained by the container independent of the articles to be packaged therein so that whole fruits, such as tomatoes and the like, may be individualized in packaged relation within the container so that when the container is opened by the ultimate consumer each fruit will be in substantially the same physical condition in which it was originally packaged.

In food canning plants, for example, containers are supplied to the packing line with one end open. The food to be packaged is placed in the container, which is sealed or capped in a sealing or capping machine and then subsequently processed in the container in the usual manner. The products to be packaged may be processed previous to packaging in the container and/or prior to sealing, whenever desired.

In the present invention the packing operator supplies the whole fruit, and so much of the liquid, if desired, to the container which, in certain forms, may have the partition or segregating means associated therewith previous to this partial filling. If the partition means is of such character that inclusion previous to partial filling is not necessary, then following partial filling the partition means is included followed by completion of the filling or by partial filling. Instead of supplying the whole fruit and the liquid medium in each partial filling, as it were, the whole fruits may be successively supplied to the container and then the desired amount of liquid medium may be supplied to the container previous to the sealing same.

The resultant packaging is that the whole fruits are maintained in their packaged physical condition until the ultimate consumer opens the package and removes the fruits, including the liquid medium therefrom. In most instances such removal requires the removal of the partition means or partial removal thereof. The packaging is so effected that the partition means is at no time dependent upon the fruit in the container for support purposes. And further, the partition means is preferably of such character that each is independently supported for compartment formation, although in certain embodiments of the invention the partition forming means may be associated together, as will hereinafter be pointed out.

In Figs. 1 and 2 of the drawing there is illustrated one embodiment of the article invention which is of complex character, as distinguished from simpler forms of the container illustrated in Fig. 1, as will be hereinafter pointed out.

Figs. 3 and 4 illustrate another embodiment of the invention, so far as the formation of the compartments by partition means is effected, through parallel partitions and/or interconnected partitions is concerned.

To facilitate an understanding of the method of packaging and the means for effecting same, reference will now be had to Figs. 1 and 2. In said figures 10 indicates a container preferably of can character. This may be of any desired material, although preferably of metallic character. It may be lined, or otherwise, as is well understood in the food canning industry. 11 indicates a can bottom suitably secured as at 12, to the bottom end of the tubular can body portion 10.

In Fig. 1 the container is shown provided with eight compartments arranged in four layers, there being two compartments per layer. Midway between the top and the bottom of the body portion 10 is a peripheral groove 13, the groove being internally positioned. Between the groove 13 and bottom 11 is a similar groove 14. Between the groove 13 and the bottom 11 is a similar groove 14. Between the top of the container and the groove 13 is a similar groove 15. Yieldingly supported in each of the grooves is a partition member; partition 16 having edge engagement with groove 14 and supported thereby, partition 17 having edge engagement with groove 13 and supported thereby. The partitions preferably are relieved so that the consumer may readily grasp the same for removing the partition to obtain access to the next lowest compartment formed thereby.

In Fig. 2 the partition is shown relieved as at 19. Any other desired formation to facilitate such operation and to provide compartment communication may be employed.

It will be understood that partitions 17 and 18 are similarly formed. If each of the resulting compartments is to receive a large fruit, such as a large tomato or a large apple or a large pear, the method of packaging is as follows:

A whole fruit is positioned in the bottom of the container, then partition 16 is applied and seated in cooperating relation with respect to groove 14. Then another fruit is applied and partition 17 is applied, etc.

In the event the smaller fruits such as apricots or plums are to be packaged each compartment thus formed may be further sectionalized. In that event, partition 16 is provided with a slot 20 that extends from one groove seated edge portion to the mid-portion, as indicated at 21. A vertical partition 22 is laterally grooved as at 23 (see Fig. 1) and the same terminates as at 24. The two partitions are interlockingly associated together. The can side wall 10 is longitudinally grooved at opposite sides as at 25 and at 26 below and above the groove 14, and by reason of the construction herein employed the grooves 25 and 26 on the same side are in alignment.

The method of packaging is as follows: Two plums, apricots or the like are placed in the bottom of the can in such relation with respect to the plane common to the grooves 25 such that the previously assembled interlocked partitions 16 and 22 may be supplied to the container and passed between the two fruits so that the edges of the partition 22 seat in the vertical grooves 25 when partition 22 engages the bottom 11 of the can. Thereafter two additional fruits are positioned in the can, one on each side of partition 22 above partition 16. Thereafter partition 17 is applied to the can and then two more fruits are positioned in the can and in the relation specified previously. Thereafter the interlocked partitions 18 and 27 interlockingly associated, as at 28, are supplied to the can. The lower portion of partition 27, has its side edges seated in opposed grooves 29 and upper portion has its side edges seating in opposed grooves 30. Adjacent grooves 29 and 30 are aligned as shown in Fig. 1. To balance the pack the grooves 29 and 30 are positioned in a plane substantially transverse to the plane common to the grooves 25 and 26.

After the interlocked partitions 18 and 27 have been properly located the final two fruits are supplied to the can. Then the liquid medium may be supplied thereto. If the pack is to be processed before sealing it is now accomplished and then sealed by securing the cover or top 31 to the top of the can side wall 10, as indicated at 32, or by any other suitable arrangement well known in the food packaging industry. Thereafter the hermetically sealed container and its contents may be processed as desired and well known in the food canning industry.

Each of the longitudinal partitions are suitably relieved, as at 22a, to facilitate insertion and withdrawal. They are, furthermore, relieved as at 22b for not only a like purpose but also to facilitate interlocking association between intersecting partitions when the same is to be employed.

Simpler embodiments of the invention are disclosed in Fig. 1 as follows: A plural compartment container may have one or more parallel peripheral grooves, as it were, although such grooving need not be of peripheral or continuous character, as shown in Fig. 2, because no grooving is required where the so-called horizontal partitions are relieved, as at 19.

To facilitate can manufacture, however, these grooves are preferably of peripheral character. These grooves also constitute re-enforcing means for stiffening the side wall of the can.

Another simple form of the invention includes an arrangement wherein a single so-called vertical partition is utilized, and when so utilized the transverse partition may be omitted and the vertical partition, such as indicated at 22, would not be slotted as at 23.

It will be quite evident, and the same is to be considered within the instant disclosure, that the grooves 25 and 26 may be made continuous and a partition member similar to partition 22 may be employed and associated with the opposed grooves of vertical character. This is peculiarly adapted for pear packaging in small cans. If desired a container of this specific character may be of dual height in which event the partition 17 would be utilized and/or bear upon the upper edge of such a lower vertical partition. In this event the grooves 29 and 30 would be made continuous and another vertical partition, similar to partition 27 but not slotted, would be associated in said combined grooves and the result will be a four compartment container. The vertical partitions may be crossed or may be co-planar. Of course it is to be understood that when this type of packaging is employed it is not necessary that the length of the elongated or combined vertical groove be actually in length equal to that of the two combined grooves.

From the foregoing, therefore, it will be understood that Fig. 1 illustrates a disclosure of a plural compartment container wherein the compartments are superimposed one above the other. It also illustrates a plural compartment container wherein the partitions extend longitudinally of the container. It also illustrates a form of the invention wherein a plurality of longitudinal partitions are therein employed and these are positioned in transverse planes. It furthermore illustrates an embodiment of the invention wherein the compartments are of superimposed character and each is longitudinally sub-divided.

In Figs. 3 and 4 there is illustrated another embodiment of the superimposed compartment type of container. In said figures 50 indicated body side wall and 5l a bottom therefor suitably secured to the lower edge thereof as at 52. A top or cover 53 is suitably secured to the body side wall as at 54. This container is of conventional character common to the industry and is the ordinary tin can for food packaging purposes. Positioned within this container is a partition forming compartment arrangement and the same includes a pair of straps 55 whereby partitions are engaged in diametrical relation. At suitable intervals each strap includes two reversely bent portions 56. These directed inwardly and from a groove 57. The various grooves 57 in the two straps are direct toward those of the other and are correspondingly spaced so as to be co-planar with each other and lie in planes parallel to the top and bottom of the can. Frictionally gripped by each grooved portion is a metallic disc 58. Preferably the straps are metallic. The discs 58 may, however, be of any other suitable material such as paper board stock, provided same is not subject to deterioration from exposure to the fruit or liquid medium, and further subject to the provision that the employment of such stock does not contaminate or create an undesirable odor or tastes in the can or to the contents thereof, respectively.

The upper end of one of one strap member is provided with a finger engageable portion 59. Both strap members may be so provided and both strap members at opposite ends may be provided so that no matter which end of the can is opened there will be available at that end one or more finger portions 59.

If desired, there may be provided immediately adjacent to the top and bottom of the can rigidizing elements 60. The position thereof is not essentially that for forming a closure for a compartment but is to maintain the metallic straps 55 in spaced relation at the ends of the can so that the weight of the various fruits carried by the intermediate partitions 58 will not cause a collapse of said straps at the ends of the can, with the result that the then lowermost fruit would be crushed. Any other suitable means or convenient arrangement may be employed for this purpose.

The method of packaging employed with this form of invention is the operator registers the skeleton frame or compartment at the top of the can, then a fruit is positioned laterally above the plane 60, if it be employed. Then the framework is partially telescoped in the can until the next partition 58 substantially registers with the top of the can. Then a fruit is positioned thereabove and the telescopic action is repeated as often as necessary. Following each telescopic action a fruit is presented laterally to the compartment formation until, upon final telescopic action the entire frame-work is positioned within the can whereupon it may be filled with the liquid medium and sealed.

Processing operations prior to and/or following sealing in the customary manner may be employed. The removal of the contents of the container in any one of the embodiments hereinbefore disclosed is effected by the consumer in substantially the reverse operation of that previously described with reference to the filling the container.

It is to be understood as previously set forth with reference to the embodiment as set forth in Figs. 3 and 4, that the partition means employed in the embodiments illustrated in Figs. 1 and 2 may be of either character, to-wit, metallic or paper board stock.

While the invention has been illustrated and described in great detail in the drawing and foregoing description, the same is to be considered as illustrative and not restrictive in character.

The several modifications described herein as well as others which will readily suggest themselves to persons skilled in this art, all are considered to be within the broad scope of the invention, reference being had to the appended claim.

The invention claimed is:

A container for packaging whole fruit including a casing of substantially cylindrical shape having a plurality of annular grooves, said casing further having a plurality of longitudinal grooves between said annular grooves, a radially slotted partition member transversely supported by said annular grooves, said partition being circumferentially relieved for liquid circulation and for finger engagement, and a vertical partition member extending above and below said transverse partition member and interlocking therewith, said vertical partition member being further supported by a plurality of the longitudinal grooves in said casing.

PAUL H. WOLF.